United States Patent [19]
Bell et al.

[11] Patent Number: 6,087,083
[45] Date of Patent: Jul. 11, 2000

[54] COLOR PHOTOGRAPHIC MATERIAL

[75] Inventors: Peter Bell, Köln; Ralf Büscher, Lohmar; Lothar Endres, Bergisch Gladbach; Lothar Rosenhahn; Rainer Scheerer, both of Köln; Lydia Simon, Wülfrath; Thomas Stetzer, Langenfeld, all of Germany

[73] Assignee: Asfa-Gevaert N.V., Belgium

[21] Appl. No.: 09/184,873

[22] Filed: Nov. 3, 1998

[30] Foreign Application Priority Data

Nov. 11, 1997 [DE] Germany ............... 197 49 722

[51] Int. Cl.[7] ............... G03C 1/08; G03C 7/26; G03C 7/32
[52] U.S. Cl. ............... 430/546; 430/505; 430/506; 430/543; 430/531; 430/533; 430/534; 430/535; 430/536; 430/537
[58] Field of Search ............... 430/546, 505, 430/506, 543, 531, 533, 534, 535, 536, 537

[56] References Cited

U.S. PATENT DOCUMENTS

| | | | |
|---|---|---|---|
| 4,186,011 | 1/1980 | Lohmann et al. | 430/505 |
| 4,857,448 | 8/1989 | Simons | 430/505 |

*Primary Examiner*—Geraldine Letscher
*Attorney, Agent, or Firm*—Connolly, Bove, Lodge & Hutz LLP

[57] ABSTRACT

A colour photographic material in which a package of layers is provided which consists, in the stated sequence, of (a) a silver halide-free layer containing colour coupler, (b) a layer containing silver halide and (c) a silver halide-free layer containing colour coupler, wherein at least one of layers (a) and (c) consists to an extent of at least 20 vol. % of a synthetic polymer, is distinguished by an improved grain/sensitivity ratio.

9 Claims, No Drawings

COLOR PHOTOGRAPHIC MATERIAL

This invention relates to a colour photographic material having a support, at least one blue-sensitive, yellow-coupling silver halide emulsion layer, at least one green-sensitive, magenta-coupling silver halide emulsion layer and at least one red-sensitive, cyan-coupling silver halide emulsion layer, which material is distinguished by an improved grain/sensitivity ratio and improved high temperature storage stability.

It is known that the presence of more than 20 vol. % of synthetic polymer in a silver halide emulsion layer improves the sensitivity/grain ratio (DE 35 20 845). However, large quantities of polymer in AgX layers impair the high temperature storage stability of the material.

Further combinations with synthetic polymer also give rise to impaired high temperature storage stability (DE 195 43 203, 195 43 202 and 195 43 201).

It has now been found that an improved grain/sensitivity ratio and improved high temperature storage stability may be achieved if a package of layers is provided in the photographic material, which package consists, in the stated sequence, of (a) a silver halide-free layer containing colour coupler, (b) a layer containing silver halide and (c) a silver halide-free layer containing colour coupler, wherein at least one of layers (a) and (c) consists to an extent of at least 20 vol. % of a synthetic polymer.

The layer containing polymer is in particular arranged closer to the support than layer (b).

The silver halide crystals present in layer (b) are preferably lamellar crystals having an aspect ratio of greater than 5 which constitute at least 70% of the projected surface area of all the silver halide crystals of this layer.

For the purposes of the present invention, synthetic polymers are preferably taken to mean high molecular weight compounds from the group of polymerisation products, polycondensation products and polyaddition products.

Polymerisation products are preferably polymers prepared from ethylenically unsaturated, low molecular weight compounds and polymers prepared from low molecular weight compounds having a ring structure.

Ethylenically unsaturated compounds are, for example, ethylene, butadiene, isoprene, vinyl aromatics, such as styrene, α-methylstyrene, divinylbenzene, chloromethylstyrene, vinyltoluene, (meth)acrylic acid derivatives such as optionally substituted (meth)acrylic acid derivatives, such as optionally substituted (meth)acrylic acid esters, (meth)acrylamides, (meth)acrylic acid, vinyl esters, vinyl armides, vinyl ethers, vinyl heterocyclics, inter alia vinylpyridine, vinylimidazole, vinyl sulphones, vinyl sulphonamides, vinyl ketones, maleic acid derivatives, fumaric acid derivatives, itaconic acid derivatives, (meth) allyl compounds, vinyl thioethers, vinyl silanes, vinyl chloride, vinylidene chloride, (meth)acrylonitrile.

Examples of the stated classes of compounds are listed in *Research Disclosure* 19 551 (1980) and Yocum, Nyquist *Functional Monomers*, volume 2, Dekker 1973.

Low molecular weight compounds having a ring structures are, for example, ethylene oxide, propylene oxide, butylene oxide, aziridines, tetrahydrofuran, caprolactam, epichlorohydrin.

Polycondensation products and polyaddition products are, for example, polyesters, polyamides, polycarbonates, polysulphones, polyurethanes, polysiloxanes, polyureas, phenyl/formaldehyde resins, polyimides, polyphenylene oxide, epoxy resins, urea/formaldehyde reins. Examples of the compounds are described in *Ullmanns Encyclopädie der technischen Chemie*, 4$^{th}$ edition, volume 19, Verlag Chemie, Weinheim, 1980.

Particularly preferred synthetic polymers are the nonionic polyurethanes known from German patent 1 522 387, the anionic polyurethanes known from German patent 1 522 393 which contain a phosphonic acid, phosphoric acid ester or phosphoric acid amide group capable of salt formation and the anionic polyurethanes known from German patent 1 472 746.

The polymers used are preferably those in dispersed form, i.e. which are of a particulate nature. The average particle size here is in the range from 20–2000 nm, preferably in the range from 20–500 nm.

Polymer dispersions having a core/shell structure, as are described in DE-A 3 516 466, are also suitable.

Polymers having a glass transition temperature $T_g$ of below +25° C. are also preferred.

Polymer dispersions which are nonionic or have an anionic charge are also preferred. Polymers exhibiting a certain solubilising action for the colour couplers used are also preferred. The colour coupler is soluble in the polymer if a polymer/coupler mixture, produced by evaporating a solution of polymer and coupler, exhibits no enthalpy of fusion of the coupler when subjected to differential thermal analysis. Polymers which are capable of dissolving more than 5 wt. % of colour coupler are preferably suitable.

The polymers are used in such a manner that they allow limited diffusion of the dye formed from the colour coupler on coupling.

Lattices which may be combined with other substances are preferably suitable. In particular, the polymers described in DE-A-3 036 846, DE-A-1 522 387, DE-A-1 472 746 are suitable. Preferred examples of polymers are L1 to L180 from *Research Disclosure* 19 551, polymer I to polymer V from DE-A-3 036 846, polyesters page 6, line 33—page 7, line 22 of EP-A-0 069 671.

Particularly preferred polymers are stated below. Some of them are combined with couplers.

Polymer P-1

Polyurethane/polyurea prepared from 800 g of a polyester prepared from adipic acid and butanediol and 95 g of 2,4-tolylene diisocyanate with reaction of the prepolymer with 53 g of N-sulphonatoethylethylenediamine. The sulphonate group content is 14.1 milliequivalents/100 g; the viscosity of a solution in acetone containing 30 wt. % solids is 300 cp at 24° C. (polymer II from U.S. Pat. No. 4,388,403).

Polymer P-2

Polyurethane/polyurea prepared from 550 g of a polyester prepared from bisphenol A and propylene oxide, 140 g of a polyester prepared from phthalic acid, adipic acid and ethylene glycol, 145 g of a 70 wt. % solution of a propoxylated addition product prepared from butenediol and sodium bisulphite in toluene and 315 g of diisocyanatohexane with reaction of the prepolymer with 77 g of urea. The sulphonate group content is 19 milliequivalents/100 g; the viscosity of a 40 wt. % solution in acetone is 60 cp (polymer IV from U.S. Pat. No. 4,388,403).

Polymer P-3

Polyurethane/polyurea prepared from 2200 g of a polyester prepared from bisphenol A and propylene oxide, 115 g of a monofunctional polyether prepared from n-butanol, propylene oxide and ethylene oxide, 160 g of a 70 wt. % solution of a propoxylated addition product prepared from butanediol and sodium bisulphite and 1096 g of tolylene diisocyanate, reaction of the prepolymer with 152 g of acetone ketazine. The sulphonate group content is 7.5 milliequivalents/100 g; the viscosity of a 36.5 wt. % solution in acetone is 19000 cp (polymer V from U.S. Pat. No. 4,388,403).

Polymer P-4

Polyaddition product prepared from 218.5 g of adipic acid/hexanediol/neopentyl glycol polyester (OH value 63), 55 g of 1,6-hexane diisocyanate and 29.8 g of potassium 1,2-diaminoethane-N-propanesulphonate.

Polymer P-5

Polyaddition product prepared from 218.5 g of adipic acid/hexanediol/neopentyl glycol polyester (OH value 63), 45.5 g of 1,6-hexane disocyanate and 138.0 g of a 20 wt. % aqueous sodium aminoethanesulphonate solution.

Polymer P-6

Polyaddition product prepared from 218.5 g of adipic acid/hexanediol/neopentyl glycol polyester (OH value 63), 44.2 g of 1,6-hexane diisocyanate and 92.0 g of a 20 wt. % aqueous sodium aminoethanesulphonate solution.

Polymer P-7
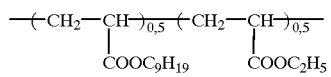

Polymer P-8
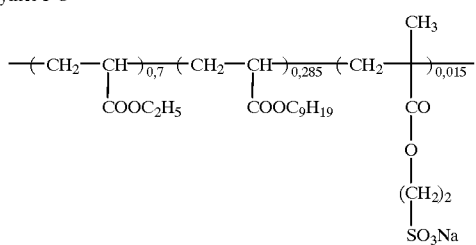

Polymer P-9
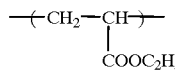

Polymer P-10
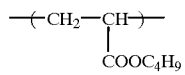

Polymer P-11
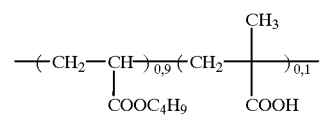

Polymer P-12
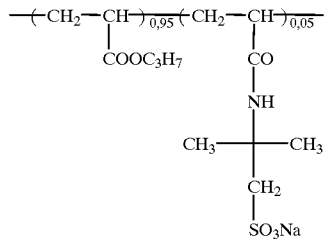

Polymer P-13
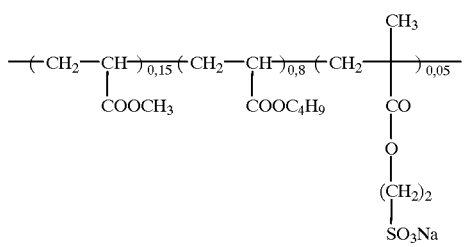

Polymer P-14
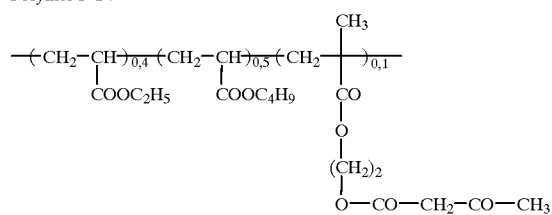

Polymer P-15
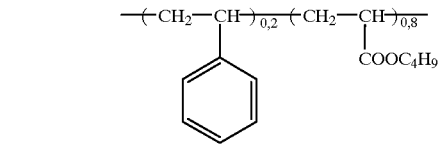

Polymer P-16
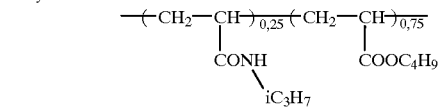

Polymer P-17
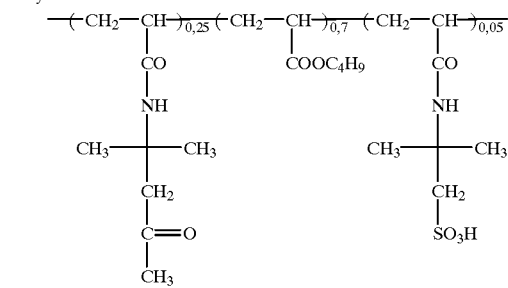

Polymer P-18
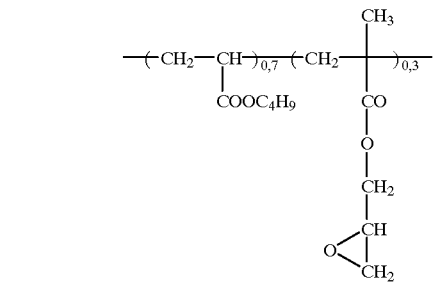

-continued

Polymer P-19

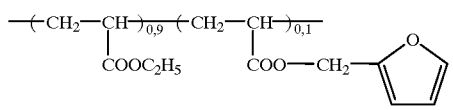

Polymer P-20

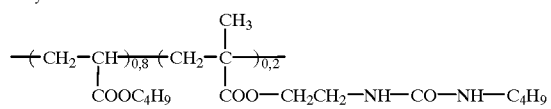

Polymer P-21

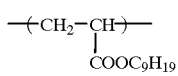

The polymers are defined as follows by average molecular weight $\overline{M}_w$ (weight average) and average particle size. In compounds P-1 to P-21, the glass transition temperature $T_g$ is below +25° C.

| | $\overline{M}_w$ | Particle size [nm] |
|---|---|---|
| P-1 | 80000 | 156 |
| P-2 | 125000 | 130 |
| P-3 | 63000 | 123 |
| P-4 | 140000 | 145 |
| P-5 | 105000 | 118 |
| P-6 | 60000 | 164 |
| P-7 | 170000 | 130 |
| P-8 | 160000 | 170 |
| P-9 | 120000 | 80 |
| P-10 | 180000 | 110 |
| P-11 | 150000 | 60 |
| P-12 | 230000 | 95 |
| P-13 | 320000 | 140 |
| P-14 | 210000 | 210 |
| P-15 | 180000 | 73 |
| P-16 | 160000 | 140 |
| P-17 | 240000 | 105 |
| P-18 | 350000 | 82 |
| P-19 | 130000 | 163 |
| P-20 | 190000 | 110 |
| P-21 | 250000 | 90 |

The synthetic polymer content of the layer is preferably at least 35 vol. %, a content of 35 to 50 vol. % being particularly preferred.

Examples of colour photographic materials are colour negative films, colour reversal films, colour positive films, colour photographic paper, colour reversal photographic paper, colour-sensitive materials for the dye diffusion transfer process or the silver dye bleaching process. A review is given in *Research Disclosure* 37038 (1995) and *Research Disclosure* 38957 (1996).

The photographic materials consist of a support onto which at least one photosensitive silver halide emulsion layer is applied. Thin films and sheets are in particular suitable as supports. A review of support materials and the auxiliary layers applied to the front and reverse sides of which is given in *Research Disclosure* 37254, part 1 (1995), page 285 and in *Research Disclosure* 38957, part XV (1996), page 627.

The colour photographic materials conventionally contain at least one red-sensitive, one green-sensitive and one blue-sensitive silver halide emulsion layer, optionally together with interlayers and protective layers.

Depending upon the type of the photographic material, these layers may be differently arranged. This is demonstrated for the most important products:

Colour photographic films such as colour negative films and colour reversal films have on the support, in the stated sequence, 2 or 3 red-sensitive, cyan-coupling silver halide emulsion layers, 2 or 3 green-sensitive, magenta-coupling silver halide emulsion layers and 2 or 3 blue-sensitive, yellow-coupling silver halide emulsion layers. The layers of identical spectral sensitivity differ with regard to their photographic sensitivity, wherein the less sensitive sub-layers are generally arranged closer to the support than the more highly sensitive sub-layers.

A yellow filter layer, which prevents blue light from reaching the underlying layers, is conventionally located between the green-sensitive and blue-sensitive layers.

Possible options for different layer arrangements and the effects thereof on photographic properties are described in *J. Inf. Rec. Mats.*, 1994, volume 22, pages 183–193 and in *Research Disclosure* 38957, part XI (1996), page 624.

Colour photographic paper, which is usually substantially less photosensitive than a colour photographic film, conventionally has on the support, in the stated sequence, one blue-sensitive, yellow-coupling silver halide emulsion layer, one green-sensitive, magenta-coupling silver halide emulsion layer and one red-sensitive, cyan-coupling silver halide emulsion layer; the yellow filter layer may be omitted.

The number and arrangement of the photosensitive layers may be varied in order to achieve specific results. For example, all high sensitivity layers may be grouped together in one package of layers and all low sensitivity layers may be grouped together in another package of layers in order to increase sensitivity (DE-25 30 645).

The substantial constituents of the photographic emulsion layers are binder, silver halide grains and colour couplers.

Details of suitable binders may be found in *Research Disclosure* 37254, part 2 (1995), page 286 and in *Research Disclosure* 38957, part II.A (1996), page 598.

Details of suitable silver halide emulsions, the production, ripening, stabilisation and spectral sensitisation thereof, including suitable spectral sensitisers, may be found in *Research Disclosure* 37254, part 3 (1995), page 286 and in *Research Disclosure* 37038, part XV (1995), page 89 and in *Research Disclosure* 38957, part V.A (1996), page 603.

Photographic materials with camera sensitivity conventionally contain silver bromide-iodide emulsions, which may optionally also contain small proportions of silver chloride.

Photographic print materials contain either silver chloride-bromide emulsions with up to 80 wt. % of AgBr or silver chloride-bromide emulsions with above 95 mol. % of AgCl.

Details relating to colour couplers may be found in *Research Disclosure* 37254, part 4 (1995), page 288, in *Research Disclosure* 37038, part 1 (1995), page 80 and in *Research Disclosure* 38957, part X.B (1996), page 616. The maximum absorption of the dyes formed from the couplers and the developer oxidation product is preferably within the following ranges: yellow coupler 430 to 460 nm, magenta coupler 540 to 560 nm, cyan coupler 630 to 700 nm.

In order to improve sensitivity, grain, sharpness and colour separation in colour photographic films, compounds are frequently used which, on reaction with the developer oxidation product, release photographically active compounds, for example DIR couplers which eliminate a development inhibitor.

Details relating to such compounds, in particular couplers, may be found in *Research Disclosure* 37254, part 5 (1995), page 290, in *Research Disclosure* 37038, part XIV (1995), page 86 and in *Research Disclosure* 38957, part X.C (1996), page 618.

Colour couplers, which are usually hydrophobic, as well as other hydrophobic constituents of the layers, are conventionally dissolved or dispersed in high-boiling organic solvents. These solutions or dispersions are then emulsified into an aqueous binder solution (conventionally a gelatine solution) and, once the layers have dried, are present in the layers as fine droplets (0.05 to 0.8 µm in diameter).

Suitable high-boiling organic solvents, methods for the introduction thereof into the layers of a photographic material and further methods for introducing chemical compounds into photographic layers may be found in *Research Disclosure* 37254, part 6 (1995), page 292.

The non-photosensitive interlayers generally located between layers of different spectral sensitivity may contain agents which prevent an undesirable diffusion of developer oxidation products from one photosensitive layer into another photosensitive layer with a different spectral sensitisation.

Suitable compounds (white couplers, scavengers or DOP scavengers) may be found in *Research Disclosure* 37254, part 7 (1995), page 292, in *Research Disclosure* 37038, part III (1995), page 84 and in *Research Disclosure* 38957, part X.D (1996), pages 621 et seq.

The photographic material may also contain UV light absorbing compounds, optical brighteners, spacers, filter dyes, formalin scavengers, light stabilisers, anti-oxidants, $D_{min}$ dyes, plasticisers (lattices), biocides and additives to improve the stability of dyes and couplers, to reduce colour fogging and to reduce yellowing and others. Suitable compounds may be found in *Research Disclosure* 37254, part 8 (1995), page 292, in *Research Disclosure* 37038, parts IV, V, VI, VII, X, XI and XII (1995), pages 84 et seq. and in *Research Disclosure* 38957, parts VI, VIII, IX and X (1996), pages 607 and 610 et seq.

The layers of colour photographic materials are conventionally hardened, i.e. the binder used, preferably gelatine, is crosslinked by appropriate chemical methods.

Suitable hardener substances may be found in *Research Disclosure* 37254, part 9 (1995), page 294, in *Research Disclosure* 37038, part XII (1995), page 86 and in *Research Disclosure* 38957, part II.B (1996), page 599.

Once exposed with an image, colour photographic materials are processed using different processes depending upon their nature. Details relating to processing methods and the necessary chemicals are disclosed in *Research Disclosure* 37254, part 10 (1995), page 294, in *Research Disclosure* 37038, parts XVI to XXII (1995), pages 95 et seq. and in *Research Disclosure* 38957, parts XVIII, XIX and XX (1996), pages 630 et seq. together with example materials.

EXAMPLES

Example 1

A colour photographic recording material for colour negative development was produced (layer structure 1A) by applying the following layers in the stated sequence onto a transparent cellulose triacetate film base. Quantities are all stated per 1 m². The silver halide application rate is stated as the corresponding quantities of $AgNO_3$; the silver halides are stabilised with 0.5 g of 4-hydroxy-6-methyl-1,3,3a,7-tetraazaindene per mol of $AgNO_3$.

1st layer (Anti-halo layer)

| | |
|---|---|
| 0.3 g | of black colloidal silver |
| 1.2 g | of gelatine |
| 0.4 g | of UV absorber UV-1 |
| 0.02 g | of tricresyl phosphate (TCP) |

2nd layer (Micrate interlayer)

| | |
|---|---|
| 0.25 g | of $AgNO_3$ of a micrate Ag(Br, I) emulsion, average grain diameter 0.07 µm, 0.5 mol. % iodide |
| 1.0 g | of gelatine |

3rd layer (Low sensitivity, red-sensitive layer)

| | |
|---|---|
| 2.7 g | of $AgNO_3$ of a spectrally red-sensitised Ag(Br, I) emulsion containing 4 mol. % iodide, average grain diameter 0.5 µm |
| 2.0 g | of gelatine |
| 0.88 g | of colourless coupler C-1 |
| 0.02 g | of DIR coupler D-1 |
| 0.05 g | of coloured coupler RC-1 |
| 0.07 g | of coloured coupler YC-1 |
| 0.75 g | of TCP |

4th layer (High sensitivity, red-sensitive layer)

| | |
|---|---|
| 2.2 g | of $AgNO_3$ of a spectrally red-sensitised Ag(Br, I) emulsion, 12 mol. % iodide, average grain diameter 1.0 µm |
| 1.8 g | of gelatine |
| 0.19 g | of colourless coupler C-2 |
| 0.17 g | of TCP |

5th layer (Interlayer)

| | |
|---|---|
| 0.4 g | of gelatine |
| 0.15 g | of white coupler W-1 |

6th layer (Low sensitivity, green-sensitive layer)

| | |
|---|---|
| 1.9 g | of $AgNO_3$ of a spectrally green-sensitised Ag(Br, I) emulsion, 4 mol. % iodide, average grain diameter 0.35 µm |
| 1.8 g | of gelatine |
| 0.54 g | of colourless coupler M-1 |
| 0.24 g | of DIR coupler D-1 |
| 0.065 g | of coloured coupler YM-1 |
| 0.6 g | of TCP |

7th layer (High sensitivity, green-sensitive layer)

| | |
|---|---|
| 1.25 g | of $AgNO_3$ of a spectrally green-sensitised Ag(Br, I) emulsion, 9 mol. % iodide, average grain diameter 0.8 µm |
| 1.1 g | of gelatine |
| 0.195 g | of colourless coupler M-2 |
| 0.05 g | of coloured coupler YM-2 |
| 0.245 g | of TCP |

8th layer (Interlayer)

| | |
|---|---|
| 0.4 g | of gelatine |
| 0.05 g | of colourless coupler M-2 |
| 0.05 g | of TCP |

9th layer (Yellow filter layer)

| | |
|---|---|
| 0.05 g | of yellow dye GF-1 |
| 0.25 g | of gelatine |
| 0.08 g | of scavenger SC-1 |
| 0.40 g | of formaldehyde scavenger FF-1 |
| 0.08 g | of TCP |

10th layer (Low sensitivity, blue-sensitive layer)

| | |
|---|---|
| 0.9 g | of a spectrally blue-sensitised Ag(Br, I) emulsion, 6 mol. % iodide, average grain diameter 0.6 µm |
| 2.2 g | of gelatine |
| 1.1 g | of colourless coupler Y-1 |
| 0.037 g | of DIR coupler D-1 |
| 1.14 g | of TCP |

11th layer (High sensitivity, blue-sensitive layer)

| | |
|---|---|
| 0.6 g | of $AgNO_3$ of a spectrally blue-sensitised Ag(Br, I) emulsion, 10 mol. % iodide, average grain diameter 1.2 µm |
| 0.6 g | of gelatine |
| 0.2 g | of colourless coupler Y-1 |
| 0.003 g | of DIR coupler D-1 |

-continued
0.22 g of TCP
12th layer (Micrate layer)
0.06 g of AgNO₃ of a micrate Ag(Br, I) emulsion, average grain diameter 0.06 μm, 0.5 mol. % iodide
1 g of gelatine
0.3 g of UV absorber UV-2
0.3 g of TCP
13th layer (Protective & hardening layer)
0.25 g of gelatine
0.75 g of hardener of the formula
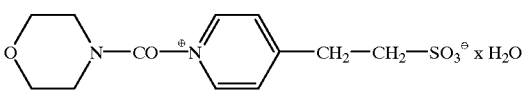
such that, once hardened, the overall layer structure had a swelling factor of ≦3.5.
Substances used in Example 1:
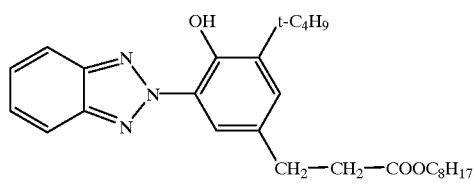
UV-1
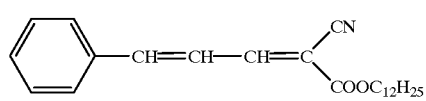
UV-2
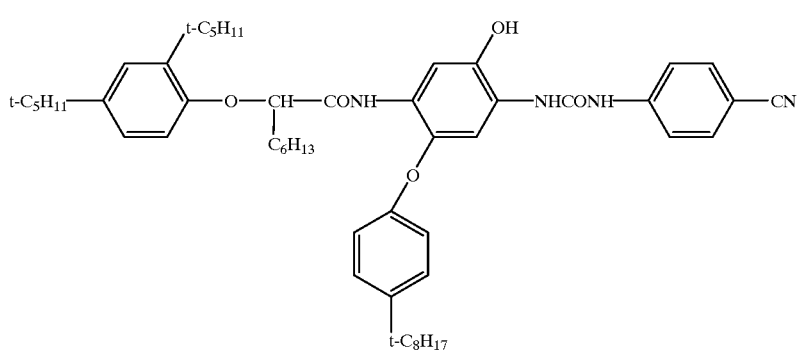
C-1
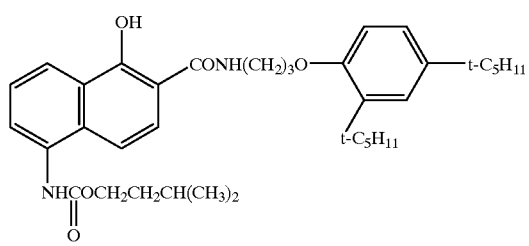
C-2

-continued
RC-1
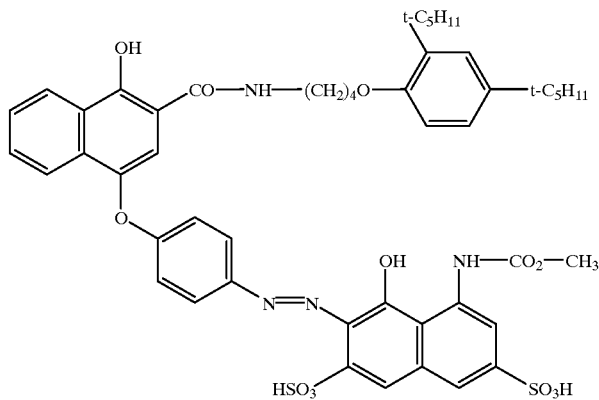
M-1
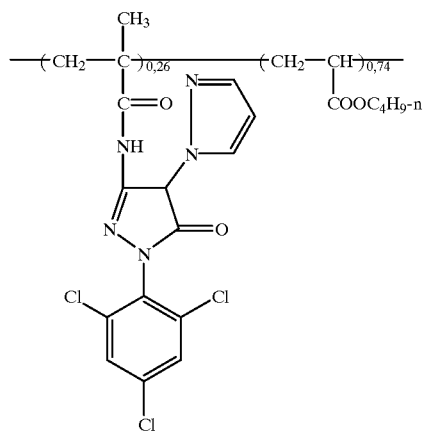
M-2
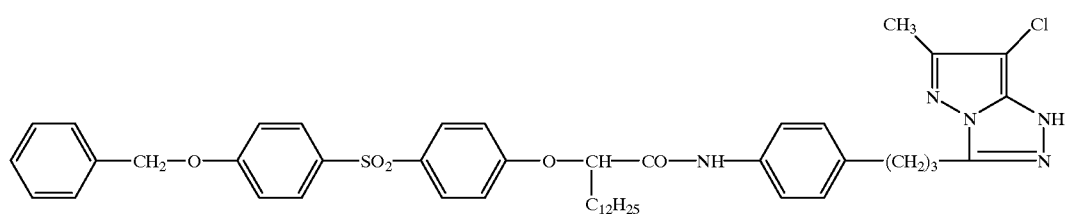
YM-1
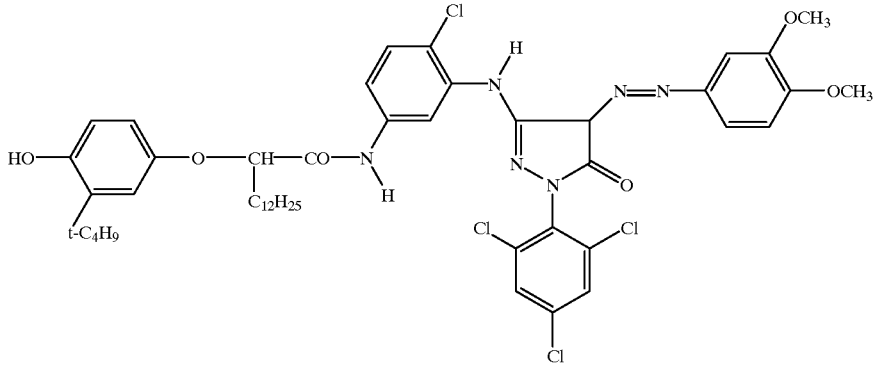

-continued
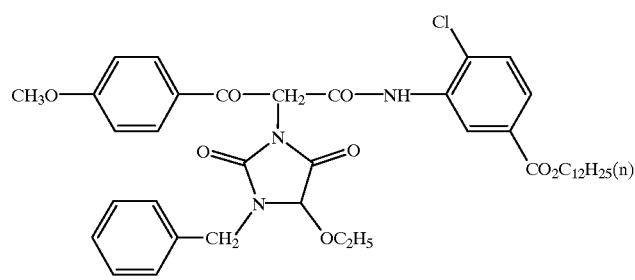
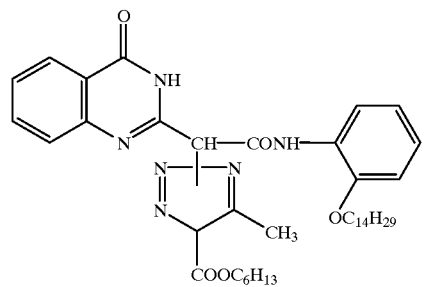
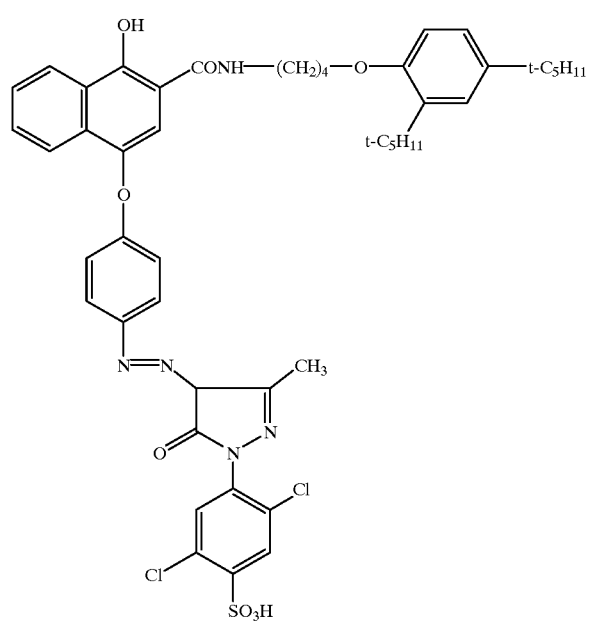
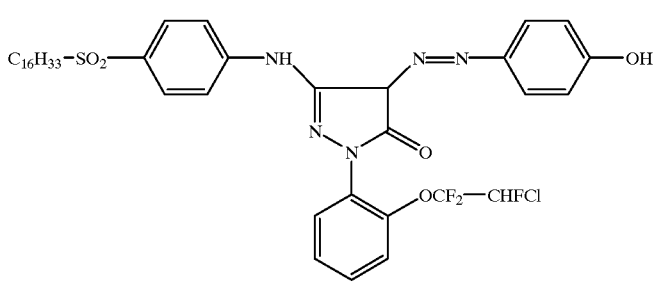
Y-1
D-1
YC-1
YM-2

SC-1

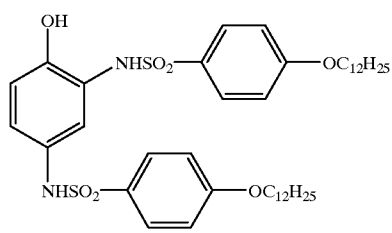

FF-1

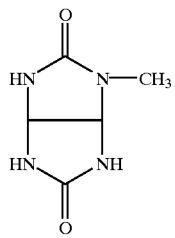

W-1

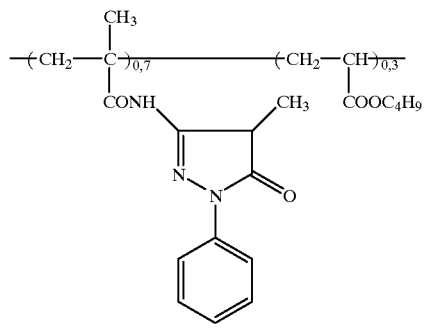

GF-1

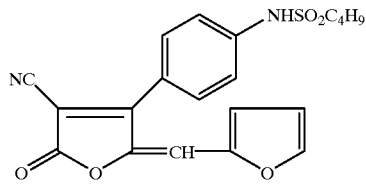

After application of a grey wedge, development is performed in accordance with *The British Journal of Photography*, 1974, pages 597 and 598.

In layer structure 1B, the 7$^{th}$ layer was of the following composition:

| 7$^{th}$ layer (High sensitivity, green-sensitive layer) | |
|---|---|
| 1.25 g | of AgNO$_3$ of a spectrally green-sensitised Ag(Br,I) emulsion, 9 mol. % iodide, average grain diameter 0.8 μm |
| 0.75 g | of gelatine |
| 0.195 g | of colourless coupler M-2 |
| 0.05 g | of colourless coupler YM-2 |
| 0.245 g | of TCP |
| 0.83 g | of polymer P-9 |

Layer structure 1C differs from layer structure 1A by having an additional layer 6a between the 6$^{th}$ and 7$^{th}$ layers and a modified 7$^{th}$ layer. The layers are of the following composition:

| Layer 6a (Interlayer) | |
|---|---|
| 0.92 g | of gelatine |
| 0.15 g | of colourless coupler M-2 |
| 0.15 g | of TCP |

| 7$^{th}$ layer (High sensitivity, green-sensitive layer) | |
|---|---|
| 1.25 g | of AgNO$_3$ of a spectrally green-sensitised Ag(Br, I) emulsion, 9 mol. % iodide, average grain diameter 0.8 μm |
| 0.80 g | of gelatine |
| 0.06 g | of colourless coupler M-2 |
| 0.05 g | of coloured coupler YM-2 |
| 0.70 g | of TCP |

Layer structure 1D corresponds to layer structure 1C with a modified layer 6a:

Layer 6a (Interlayer)

| | |
|---|---|
| 0.30 g | of gelatine |
| 0.15 g | of colourless coupler M-2 |
| 0.15 g | of TCP |
| 0.40 g | of polymer P-9 |

Layer structure 1E corresponds to layer structure 1D with a modified 8$^{th}$ layer:

8$^{th}$ layer (Interlayer)

| | |
|---|---|
| 0.30 g | of gelatine |
| 0.05 g | of colourless coupler M-2 |
| 0.05 g | of TCP |
| 0.30 g | of polymerP-10 |

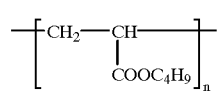

P-10 average MW 180 000 average particle size 110 nm.

Table 1 shows the measured values for layer structures 1A to 1 E for sensitivity, grain and increase in fog after two weeks' storage at 50° C. and 35% relative humidity.

TABLE 1

| Layer structure | Relative sensitivity, green | Grain, magenta*) | Increase in fog | |
|---|---|---|---|---|
| 1A | 100 | 10.0 | 0.03 | Comparison |
| 1B | 102 | 8.0 | 0.17 | Comparison |
| 1C | 95 | 8.5 | 0.03 | Comparison |
| 1D | 104 | 8.0 | 0.02 | Invention |
| 1B | 110 | 8.0 | 0.03 | Invention |

*) Grain (RMS) at density 0.6 above fog, values ·1000.

As can be seen, there is an improvement in the sensitivity/grain ratio accompanied by good high temperature storage stability in the materials according to the invention.

Example 2

Layer structure 2A corresponds to layer structure 1A. The red-sensitive layer package in layer structure 2B is of the following composition:

3$^{rd}$ layer (Low sensitivity, red-sensitive layer)

| | |
|---|---|
| 2.7 g | of AgNO$_3$ of a spectrally red-sensitised Ag(Br, I) emulsion containing 4 mol. % iodide, average grain diameter 0.5 μm |
| 2.0 g | of gelatine |
| 0.88 g | of colourless coupler C-1 |
| 0.02 g | of DIR coupler D-1 |
| 0.05 g | of coloured coupler RC-1 |
| 0.07 g | of coloured coupler YC-1 |
| 0.75 g | of TCP |

Layer 3a (Interlayer)

| | |
|---|---|
| 0.90 g | of gelatine |
| 0.10 g | of colourless coupler C-2 |
| 0.10 g | of TCP |

4$^{th}$ layer (High sensitivity, red-sensitive layer)

| | |
|---|---|
| 2.2 g | of AgNO$_3$ of a spectrally red-sensitised Ag(Br, I) emulsion, 12 mol. % iodide, ayerage grain diameter 1.0 μm |
| 1.8 g | of gelatine |
| 0.10 g | of colourless coupler C-2 |
| 0.10 g | of TCP |

5$^{th}$ layer (Interlayer)

| | |
|---|---|
| 0.85 g | of gelatine |
| 0.05 g | of colourless coupler C-2 |
| 0.05 g | of TCP |

Layer structure 2C differs from layer structure 2B by having a modified layer 3 a:

Layer 3a (Interlayer)

| | |
|---|---|
| 0.30 g | of gelatine |
| 0.10 g | of colourless coupler C-2 |
| 0.10 g | of TCP |
| 0.30 g | of polymer P-9 |

Layer structure 2D differs from layer structure 2B by having a modified 5$^{th}$ layer.

5$^{th}$ layer (Interlayer)

| | |
|---|---|
| 0.40 g | of gelatine |
| 0.05 g | of colourless coupler C-2 |
| 0.05 g | of TCP |
| 0.30 g | of polymer P-9 |

The results are shown in table 2.

TABLE 2

| Layer structure | Relative sensitivity, red | Grain, cyan*) | Increase in fog | |
|---|---|---|---|---|
| 2A | 100 | 9.5 | 0.03 | Comparison |
| 2B | 94 | 9.0 | 0.02 | Comparison |
| 2C | 108 | 8.5 | 0.03 | Invention |
| 2D | 105 | 8.0 | 0.03 | Invention |

*) Grain (RMS) at density 0.6 above fog, values × 1000.

As can be seen, there is an improvement in the sensitivity/grain ratio accompanied by good high temperature storage stability in the materials according to the invention.

What is claimed is:

1. A color photographic material which comprises a support, at least one blue-sensitive, yellow-coupling silver halide emulsion layer, at least one green-sensitive, magenta-coupling silver halide emulsion layer and at least one red-sensitive, cyan-coupling silver halide emulsion layer, and a package of layers is provided which consists essentially of, in the stated sequence, of (a) a silver halide-free layer containing color coupler, (b) a layer containing silver halide and (c) a silver halide-free layer containing color coupler, wherein at least one of layers (a) and (c) contains at least 20 vol. % of a synthetic polymer.

2. The color photographic material according to claim 1, wherein the synthetic polymer is particulate with an average particle size of 20 to 2000 nm and has a glass transition temperature T$_g$ of below +25° C.

3. The color photographic material according to claim 1, wherein the polymer content is 35 to 50 vol. %.

4. The color photographic material according to claim 1, wherein the layer containing polymer is arranged closer to the support than the layer (b).

5. The color photographic material according to claim 1, wherein said silver halide in layer (b) has lamellar crystals having an aspect ratio of greater than 5, which constitute at least 70% of the projected surface area of all of the silver halide crystals in said layer (b).

6. The color photographic material according to claim 1, wherein the synthetic polymer is particulate with an average particle size of 20 to 500 nm and has a glass transition temperature $T_g$ of below +25° C.

7. The color photographic material according to claim 5, wherein the synthetic polymer is particulate with an average particle size of 20 to 500 nm and has a glass transition temperature $T_g$ of below +25° C.

8. The color photographic material according to claim 2, wherein the polymer content is at least 35 vol. %.

9. The color photographic material according to claim 7, wherein the polymer content is 35 vol. % to 50 vol. %.

* * * * *